US012361952B2

(12) United States Patent
Liang

(10) Patent No.: US 12,361,952 B2
(45) Date of Patent: Jul. 15, 2025

(54) DATA TRANSMISSION METHOD AND APPARATUS, TERMINAL, STORAGE MEDIUM, AND SYSTEM

(71) Applicant: TENCENT TECHNOLOGY (SHENZHEN) COMPANY LIMITED, Guangdong (CN)

(72) Inventor: Junbin Liang, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 513 days.

(21) Appl. No.: 17/675,400

(22) Filed: Feb. 18, 2022

(65) Prior Publication Data

US 2022/0172731 A1 Jun. 2, 2022

Related U.S. Application Data

(63) Continuation of application No. PCT/CN2020/127444, filed on Nov. 9, 2020.

(30) Foreign Application Priority Data

Feb. 10, 2020 (CN) ......................... 202010085293.3

(51) Int. Cl.
*G10L 19/00* (2013.01)
*G10L 19/005* (2013.01)
(Continued)

(52) U.S. Cl.
CPC ............ *G10L 19/005* (2013.01); *G10L 25/06* (2013.01); *G10L 25/90* (2013.01)

(58) Field of Classification Search
CPC ..... G10L 21/04; G10L 21/045; G10L 21/043; G10L 21/047; G10L 25/00; G10L 25/06;
(Continued)

(56) References Cited

U.S. PATENT DOCUMENTS 6,574,218 B1 6/2003 Cooklev
2011/0271163 A1* 11/2011 Le Floch ................ H04L 1/002 714/752
2020/0219519 A1* 7/2020 Wang ...................... G10L 19/18

FOREIGN PATENT DOCUMENTS

CN 101505202 A 8/2009
CN 104796735 A 7/2015
(Continued)

OTHER PUBLICATIONS

Charpentier, Francis; Moulines, Eric, "Pitch-Synchronous Waveform Processing Techniques for Text-to-Speech Synthesis Using Diphones", Aug. 1990, Elsevier Science Publishers B.V. (Year: 1990).*

(Continued)

*Primary Examiner* — Edgar X Guerra-Erazo
(74) *Attorney, Agent, or Firm* — Sughrue Mion, PLLC

(57) ABSTRACT

A data transmission method and apparatus, a terminal, a storage medium, and a system. The data transmission method includes: obtaining audio data and transmission status information, determining a compression factor and a redundancy factor based on the transmission status information, performing time domain data compression processing on the audio data according to the compression factor to obtain compressed data, performing channel coding on the compressed data according to the redundancy factor to obtain a data transmission packet, and transmitting the data transmission packet.

18 Claims, 4 Drawing Sheets

(51) Int. Cl.
*G10L 25/06* (2013.01)
*G10L 25/90* (2013.01)

(58) Field of Classification Search
CPC ......... G10L 25/03; G10L 25/09; G10L 25/27; G10L 25/30; G10L 25/45; G10L 25/72; G10L 25/69; G10L 25/51; G10L 25/75; G10L 25/78; G10L 2025/783; G10L 2025/786; G10L 25/81; G10L 25/87; G10L 2025/932; G10L 2025/935; G10L 25/93; G10L 2025/937; G10L 25/60; G10L 25/12; G10L 25/15; G10L 25/18; G10L 25/21; G10L 25/24; G10L 21/057; G10L 21/028; G10L 21/0272; G10L 21/0308; G10L 21/0316; G10L 21/034; G10L 21/0332; G10L 21/0324; G10L 21/0364; G10L 21/02; G10L 21/01; G10L 21/003; G10L 2019/0012; G10L 2019/0015; G10L 2019/0014; G10L 2019/0013; G10L 2019/0007; G10L 2019/0001; G10L 19/0017; G10L 19/002; G10L 19/005; G10L 19/008; G10L 19/012; G10L 19/02; G10L 19/0204; G10L 19/0208; G10L 19/0212; G10L 19/0216; G10L 19/022; G10L 19/025; G10L 19/028; G10L 19/04; G10L 19/032; G10L 19/018; G10L 19/08; G10L 19/093; G10L 19/097; G10L 19/113; G10L 19/107; G10L 19/10; G10L 19/12; G10L 19/125; G10L 19/13; G10L 19/135; G10L 19/16; G10L 19/167; G10L 19/173; G10L 19/20; G10L 19/24; G10L 19/22; G10L 19/26; G10L 19/265; G10L 21/007; G10L 21/0208; G10L 2021/02082; G10L 2021/02085; G10L 2021/02087; G10L 2021/02163; G10L 2021/02165; G10L 2021/02166; G10L 2021/02168; G10L 21/0224; G10L 21/0232; G10L 21/0264; G10L 2021/02161; G10L 21/0216; G10L 21/013; G10L 19/038; G10L 19/035; G10L 19/03; G10L 19/07; G10L 19/083; G10L 19/087; G10L 19/09; G10L 2019/001; G10L 2019/0011; G10L 2019/0008; G10L 2019/0009; G10L 2019/0004; G10L 19/00; G10L 2013/021; G10L 13/02

See application file for complete search history.

(56) References Cited

FOREIGN PATENT DOCUMENTS

| | | | |
|---|---|---|---|
| CN | 107181968 | A | 9/2017 |
| CN | 109218083 | A | 1/2019 |
| CN | 109524015 | A | 3/2019 |
| CN | 111314335 | A | 6/2020 |

OTHER PUBLICATIONS

Ilk, Hakk Gökhan; Tugaç Serdar, "Channel and Source Considerations of a Bit-Rate Reduction Technique for a Possible Wireless Communications System's Performance Enhancement", Jan. 2005, IEEE (Year: 2005).*

Bhute, Vijaya P.; Shrawankar, Urmila N., "Speech Packet Concealment Techniques Based on Time-Scale Modification for VoIP", 2008, IEEE (Year: 2008).*

Zhao Mincheng et al., "Method for video dynamic transmission in TDMA wireless network", Science & Technology Vision, China Academic Journal Electronic Publishing House, Jun. 15, 2016, pp. 5-6.

CN Office Action for 202010085293.3, dated Feb. 3, 2021.

International Search Report for PCT/CN2020/127444, dated Jan. 27, 2021.

Written Opinion for PCT/CN2020/127444, dated Jan. 27, 2021.

* cited by examiner

DATA TRANSMISSION METHOD AND APPARATUS, TERMINAL, STORAGE MEDIUM, AND SYSTEM

CROSS-REFERENCE TO RELATED APPLICATION(S)

This application is a continuation application of International Application No. PCT/CN2020/127444, filed on Nov. 9, 2020, which claims priority to Chinese Patent Application No. 202010085293.3, filed with the National Intellectual Property Administration on Feb. 10, 2020, the disclosures of which are incorporated by reference in their entireties.

FIELD

The disclosure relates to the field of data transmission, and specifically, to a data transmission method and apparatus, a terminal, a storage medium, and a system.

BACKGROUND

Internet is a transmission network that is prone to network fluctuations and congestion. For applications with high network requirements, especially Internet audio applications, existing data transmission methods are prone to packet loss, that is, audio data packet missing transmission and mistransmission caused by the network fluctuations. For example, Internet audio applications such as a live voice, a voice call, and a voice broadcasting have high requirements for network stability and bandwidth. Otherwise, an audio received by a receiving end may be incoherent or stuttering.

In existing data transmission methods, to resolve the data missing transmission and mistransmission caused by packet loss, redundant data is repeatedly transmitted in a large quantity to reduce the impact of packet loss. However, such methods consume a lot of network resources and take a lot of time and computing resources to process and transmit the redundant data. Therefore, the existing data transmission methods are inefficient.

SUMMARY

According to various embodiments provided in the disclosure, a data transmission method and apparatus, a terminal, a storage medium, and a system are provided.

According to an embodiment of the disclosure, a data transmission method, adapted to a transmitting end, may be provided, the method including: obtaining audio data and transmission status information; determining a compression factor and a redundancy factor based on the transmission status information; performing time domain data compression processing on the audio data according to the compression factor to obtain compressed data; performing channel coding on the compressed data according to the redundancy factor to obtain a data transmission packet; and transmitting the data transmission packet.

According to an embodiment of the disclosure, a data transmission method, adapted to a receiving end, may be provided, the method including: obtaining a data transmission packet, the data transmission packet including redundant data and a compression factor; determining transmission status information at a current moment based on the data transmission packet; transmitting the transmission status information at the current moment; performing channel decoding on the data transmission packet according to the redundant data to obtain target data; and performing time domain data decompression processing on the target data according to the compression factor to obtain restored data.

According to an embodiment of the disclosure, a data transmission apparatus, adapted to a transmitting end, may be provided, the apparatus including: a first obtaining unit, configured to obtain audio data and transmission status information; a factor unit, configured to determine a scaling factor and a redundancy factor based on the transmission status information; a compression unit, configured to perform time domain data compression processing on the audio data according to the scaling factor to obtain compressed data; an encoding unit, configured to perform channel coding on the compressed data according to the redundancy factor to obtain a data transmission packet; and a first transmitting unit, configured to transmit the data transmission packet.

According to an embodiment of the disclosure, a data transmission apparatus, adapted to a receiving end, may be provided, the apparatus including: a second obtaining unit, configured to obtain a data transmission packet, the data transmission packet including redundant data and a scaling factor; an occupancy unit, configured to determine transmission status information at a current moment based on the data transmission packet; a second transmitting unit, configured to transmit the transmission status information at the current moment; a decoding unit, configured to perform channel decoding on the data transmission packet according to the redundant data to obtain target data; and a decompression unit, configured to perform time domain data decompression processing on the target data according to the scaling factor to obtain restored data.

According to an embodiment of the disclosure, a terminal may be provided, including a memory and a processor, the memory storing computer-readable instructions, the computer-readable instructions, when executed by the processor, causing the processor to perform operations in any one of the data transmission methods according to the embodiments of the disclosure.

According to an embodiment of the disclosure, one or more non-volatile storage media may be provided, storing computer-readable instructions, the computer-readable instructions, when executed by one or more processors, causing the one or more processors to perform operations in any one of the data transmission methods according to the embodiments of the disclosure.

An embodiment of the disclosure may further provide a data transmission system, including a transmitting end and a receiving end.

The transmitting end is configured to obtain audio data and obtain transmission status information transmitted by the receiving end; determine a scaling factor and a redundancy factor based on the transmission status information; perform time domain data compression processing on the audio data according to the scaling factor to obtain compressed data; perform channel coding on the compressed data according to the redundancy factor to obtain a data transmission packet; and transmit the data transmission packet to the receiving end.

The receiving end is configured to obtain the data transmission packet transmitted by the transmitting end, the data transmission packet including redundant data and a scaling factor; determine transmission status information at a current moment based on the data transmission packet; transmit the transmission status information at the current moment to the transmitting end; perform channel decoding on the data transmission packet to obtain target data; and perform time domain data decompression processing on the target data according to the scaling factor to obtain restored data.

Details of one or more embodiments of the disclosure are provided in the accompanying drawings and descriptions below. Other features, objectives, and advantages of the disclosure become apparent from the specification, the drawings, and the claims.

BRIEF DESCRIPTION OF THE DRAWINGS

To describe the technical solutions of embodiments of the disclosure more clearly, the following briefly describes accompanying drawings required for describing the embodiments. The accompanying drawings in the following description show merely some embodiments of the disclosure, and a person skilled in the art may still derive other drawings from these accompanying drawings without creative efforts. In addition, one of ordinary skill would understand that aspects of example embodiments may be combined together or implemented alone.

DESCRIPTION OF EMBODIMENTS

To make the objectives, technical solutions, and advantages of the present disclosure clearer, the following further describes the present disclosure in detail with reference to the accompanying drawings. The described embodiments are merely some rather than all of the embodiments of the disclosure. All other embodiments obtained by a person skilled in the art based on the embodiments of the disclosure without creative efforts shall fall within the protection scope of the disclosure.

The embodiments of the disclosure provide a data transmission method and apparatus, a terminal, a storage medium, and a system.

The data transmission apparatus may be integrated in an electronic device, and is adapted to a transmitting end and a receiving end. The transmitting end and the receiving end may be the same electronic device or different electronic devices. In a case that the transmitting end and the receiving end are different electronic devices, the transmitting end and the receiving end may be electronic devices of the same type, or electronic devices of different types.

For example, the electronic device may be a device such as a terminal, or a server. The terminal may be a device such as a mobile phone, a tablet computer, an intelligent Bluetooth device, a notebook computer, or a personal computer (PC). The server may be a single server or a server cluster including a plurality of servers.

In some embodiments, the data transmission apparatus may alternatively be integrated in a plurality of electronic devices. For example, the data transmission apparatus may be integrated in a plurality of servers, and the plurality of servers implement the data transmission method of the disclosure.

In some embodiments, the server may alternatively be implemented in a form of a terminal.

Figure 1A:
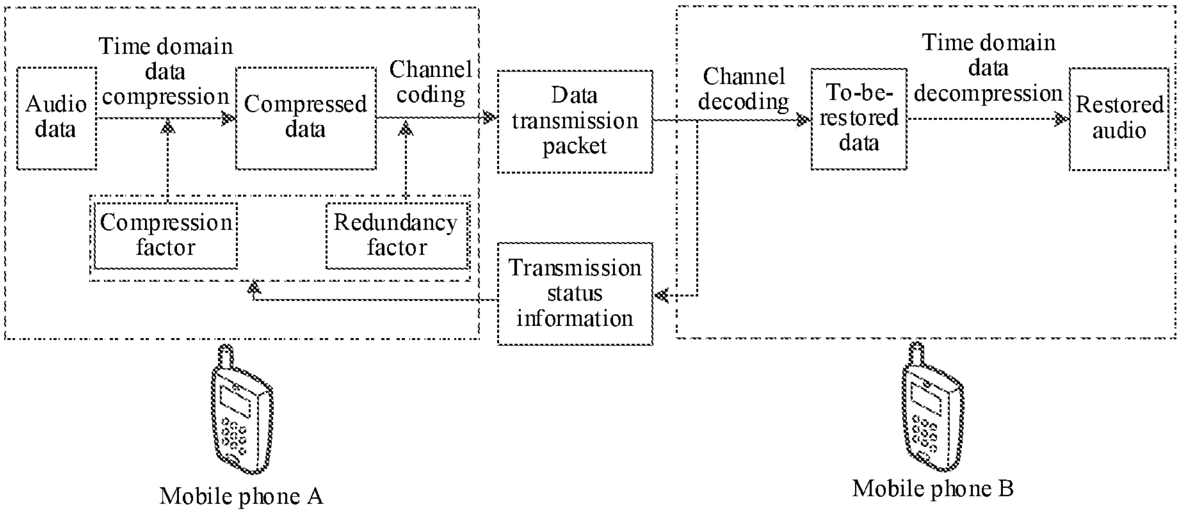
FIG. 1*a* is a schematic diagram of a scenario of a data transmission system according to an embodiment of the disclosure.

For example, referring to FIG. 1*a*, the data transmission system may include a mobile phone A as the transmitting end and a mobile phone B as the receiving end.

The mobile phone A can obtain audio data and obtain transmission status information from the mobile phone B; determine a compression factor and a redundancy factor based on the transmission status information; perform time domain data compression processing on the audio data according to the compression factor to obtain compressed data; perform channel coding on the compressed data according to the redundancy factor to obtain a data transmission packet; and transmit the data transmission packet to the mobile phone B.

The mobile phone B can obtain the data transmission packet and the compression factor from the mobile phone A; determine transmission status information at a current moment based on the data transmission packet; transmit the transmission status information at the current moment to the mobile phone A; perform channel decoding on the data transmission packet to obtain target data; and perform time domain data decompression processing on the target data according to the compression factor to obtain restored data.

Detailed descriptions are separately provided below. Sequence numbers of the following embodiments are not intended to limit preference orders of the embodiments.

Figure 1B:
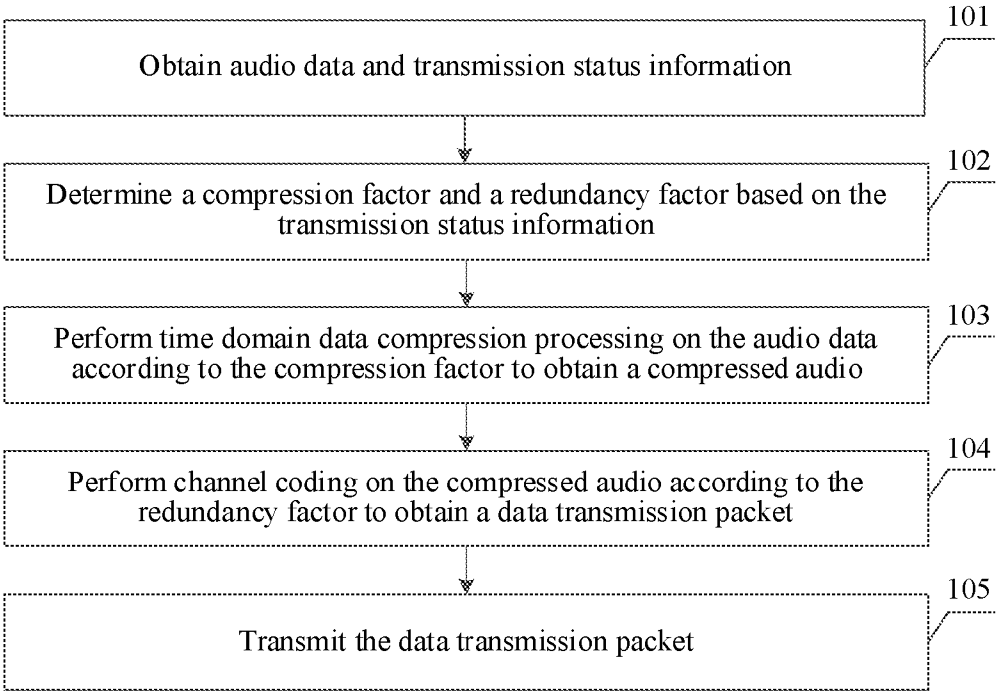
FIG. 1*b* is a first schematic flowchart of a data transmission method according to an embodiment of the disclosure.

In some embodiments, a data transmission method based on data transmission is provided. As shown in FIG. 1*b*, the description is made by using an example in which the method is applied to a transmitting end, and the process of the data transmission method may be as follows:

101: Obtain audio data and transmission status information.

The audio data refers to electronic data information to be transmitted, and the electronic data information may be expressed in a plurality of data types, for example, pure audio data, video data including audio, or the like.

The transmission status information refers to related information capable of reflecting a data transmission status. For example, the transmission status information may include a channel utilization, a bandwidth, a packet loss rate, a redundancy rate of a transmitting end, a sender bit rate, a receiving bit rate, a transmission rate, a signal-to-noise ratio, a channel gain, a noise power, or the like.

In this embodiment, the audio data can be obtained in a variety of ways. For example, the audio data can be obtained from a database through a network, be captured and recorded by a sensor, be obtained by user input, or be read locally.

For example, in some embodiments, the audio data of a user can be recorded and obtained by using a mounted recording device.

In this embodiment, the transmission status information can be obtained in a variety of ways. For example, the transmission status information can be obtained from a database through a network, be acquired through a sensor, be obtained from the receiving end through the network, or be read locally.

For example, in some embodiments, the transmission status information transmitted by the receiving end can be obtained by communicating with the receiving end through the network.

102: Determine a compression factor and a redundancy factor based on the transmission status information.

The compression factor is a physical quantity describing the compressibility. The redundancy factor is a physical quantity describing a proportion of redundant data accounting for a transmitted data packet.

The receiving end can check and correct the received data information by using the redundant data, and the redundant data may be an error correction code, an error checking code, a data fragment of transmission data, or the like.

For example, in some embodiments, if the compression factor is 0.9, it can be described that the data is compressed to 0.9 times the original size.

For example, in some embodiments, if the redundancy factor is 0.3, it can be described that 30% of the transmitted data is redundant data, and the remaining 70% is effective data.

In some embodiments, in order to analyze a current working status of a channel more quickly and easily, and increase a redundancy rate when a packet loss rate increases and reduce the compression factor when the channel is congested to reduce the size of the transmitted data packet, the transmission status information may include a receiving quantity, and operation 102 may include the following operations:

- collecting statistics on the transmitted data transmission packet to obtain a sender bit rate and a transmission quantity;
- calculating a packet loss rate according to the transmission quantity and the receiving quantity;
- determining a redundancy factor based on the packet loss rate; and
- determining a compression factor based on the packet loss rate and the sender bit rate.

In this embodiment, for example, statistics on the data transmission packet transmitted within a preset historical time period are collected to obtain the sender bit rate and the transmission quantity.

The sender bit rate refers to the total size of the effective data and the redundant data transmitted by the transmitting end per unit time, which is measured in bytes.

The transmission quantity refers to the quantity of data packets transmitted by the transmitting end per unit time.

The receiving quantity refers to the quantity of data packets received by the receiving end per unit time.

The packet loss rate refers to a ratio of the quantity of packets lost to the transmission quantity per unit time. In a case that the network is unstable, the packet loss rate may increase, that is, the probability of losing data from a channel may increase, causing problems such as video mosaic, local distortion, blurred images, frequent refresh, audio and video out of synchronization, image freezing and latency, or audio interruption. The higher the packet loss rate, the more obvious the impact on a data transmission application such as an audio and video call.

In this embodiment, to reduce the packet loss rate, the effective data may be repeatedly transmitted, that is, the redundant data may be transmitted. In this embodiment, the redundancy factor can be modified, so that the transmitting end transmits a certain amount of redundant data to ensure that the information received by the receiving end is complete and correct.

For example, in this embodiment, if the transmission quantity is 100 and the receiving quantity is 75, the packet loss rate is 25%, that is, 25 pieces of transmission data is lost. At this time, it is determined that the packet loss rate of the channel is high, then the current redundancy factor is modified to 0.25. That is, provided that 100 transmission data is transmitted again, the redundant data occupies 25 pieces, and the effective data occupies 75 pieces. In some embodiments, it can be determined that the channel is currently at the upper working limit in a case that the packet loss rate and the sender bit rate are positively correlated within the preset historical time period, that is, the more redundant data in the transmitted data packet, the higher the packet loss rate. To prevent the continued repeated data transmission from causing network collapse to the channel, the compression factor can be set to reduce the size of the transmitted data, so that the sender bit rate is reduced, and therefore the pressure on the channel is reduced.

In some embodiments, the operation "determining a compression factor based on the packet loss rate and the sender bit rate" may include the following operations:

- a: collecting statistics on the packet loss rate and the sender bit rate respectively to obtain a first change trend corresponding to the packet loss rate and a second change trend corresponding to the sender bit rate, and a correlation between the packet loss rate and the sender bit rate; and
- b: determining the compression factor according to the packet loss rate and the sender bit rate in a case that the first change trend and the second change trend are both rising trends and the correlation between the packet loss rate and the sender bit rate is positive.

That is, the compression factor can be modified at this time in a case that a network bandwidth of the channel reaches an upper limit and the packet loss rate and the sender bit rate show a rising trend and are positively correlated with each other, to reduce the sender bit rate, so that the pressure on the channel is reduced and the channel stability is maintained.

In some embodiments, the compression factor may be transmitted when the data transmission packet is transmitted, for example, the data transmission packet and the compression factor can be transmitted to the receiving end through the network simultaneously.

103: Perform time domain data compression processing on the audio data according to the compression factor to obtain compressed data.

The time domain data compression refers to the deletion, or transformation of some data in electronic data in a time domain to achieve the compression effect.

There are a variety of time domain data compression methods, including, for example, adaptive differential pulse code modulation (ADPCM), linear predictive coding (LPC), code excited linear prediction (CELP) coding, an overlap-and-add (OLA) algorithm, or the like. The OLA algorithm may include a synchronized overlap-add (SOLA) algorithm, a pitch synchronized overlap-add (PSOLA) algorithm, a waveform similarity overlap-and-add (WSOLA) algorithm, or the like.

In some embodiments, to resolve compressed data discontinuity, pitch fracture, or other issues, the PSOLA algorithm can be adopted to perform time domain data compression. Operation 103 may include the following operations:

- performing pitch analysis on the audio data to determine a pitch point corresponding to the audio data;

performing data sampling on the audio data according to the pitch point to obtain a plurality of pieces of sub-audio data;

selecting target sub-audio data from the plurality of pieces of sub-audio data according to the compression factor; and synthesizing the target sub-audio data to obtain the compressed data.

The pitch is a main time-domain parameter determining a speech prosody. The core of the time-domain PSOLA algorithm is pitch synchronization. First, the pitch in the audio data is annotated, for example, a voiced sound is annotated. Then, data sampling is performed on the audio data according to the pitch point to obtain a plurality of pieces of sub-audio data, and a series of insertion, deletion, modification, and synthesis are performed on the sub-audio data to obtain the compressed data.

In some embodiments, the OLA algorithm can be adopted to perform time domain data compression. Operation 103 may include the following operations:

determining a sampling window according to the compression factor;

performing data sampling on the audio data based on the sampling window to obtain sub-audio data; and synthesizing the sub-audio data to obtain the compressed data.

In this embodiment, a sampling window factor may be determined according to the compression factor, for example, an operation size, a window size, or the like. Then, the sampling window is smoothly shifted in the audio data, and the data in the sampling window is sampled at every certain operation to obtain the sub-audio data. Finally, all the sub-audio data are overlapped and added to obtain the compressed data.

In some embodiments, to resolve poor voice quality caused by issues such as compressed data discontinuity, the WSOLA algorithm can be adopted to perform time domain data compression. Optionally, the operation "synthesizing the sub-audio data to obtain the compressed data" may include the following operations:

calculating a waveform cross-correlation coefficient between the sub-audio data;

determining sub-audio data with similar waveforms according to the waveform cross-correlation coefficient; and performing waveform overlap-add processing on the sub-audio data with the similar waveforms to obtain the compressed data.

The waveform cross-correlation coefficient can describe the degree of similarity between two waveforms. In this embodiment, two pieces of sub-audio data with similar waveforms may be overlapped and added, and the compressed data is obtained.

104: Perform channel coding on the compressed data according to the redundancy factor to obtain a data transmission packet.

Due to various reasons, there is often an error code generated in a transmitted data stream during transmitting a digital signal, causing the receiving end to produce an image jump, a distortion, a discontinuity, a mosaic, or the like. Corresponding processing is performed on the data through channel coding, so that the channel has a certain error correction capability and anti-interference capability, greatly avoiding the occurrence of the error code during data transmission.

The channel coding includes a variety of coding manners, for example, error correction coding, error checking coding, or the like. An error correction code may include a forward error correction (FEC) code, a reed-solomon (RS) code, a convolutional code, a turbo code, or the like.

In this embodiment, the redundant data corresponding to the compressed data may be generated according to the redundancy factor, and then the redundant data and the compressed data are coded by the channel coding and packaged to obtain the data transmission packet.

In some embodiments, the redundancy factor may be coded by the channel coding to obtain a compression factor identifier, and then the compressed data is coded by the channel coding according to the compression factor identifier to obtain the data transmission packet.

The compression factor identifier is an identifier carrying information about the compression factor, and can be used for indicating the size of the compression factor.

For example, in some embodiments, the compression factor identifier corresponding to the compression factor may be used as a data transmission packet header.

105: Transmit the data transmission packet.

Finally, the data transmission packet can be transmitted to the receiving end.

During transmitting the data transmission packet, the compression factor can be transmitted within a period of time, or a data packet with the compression factor identifier as the header can be transmitted. The data transmission solution provided in the embodiments of the disclosure may be applied to various data transmission scenarios, for example, in an audio transmission scenario, especially voice over Internet Protocol (VoIP, which is IP-based voice transmission), a voice broadcasting, an audio and video live broadcasting, or the like, which have relatively high requirements for a packet loss rate and a latency rate. According to the embodiments of the disclosure, a working condition of the channel can be monitored in real time, and redundant data transmission and audio compression effect are controlled according to the working condition. Therefore, the solution provided in the embodiments of the disclosure can perform data transmission more efficiently while ensuring the audio effect.

It can be seen from the above that, the embodiments of the disclosure can obtain audio data and transmission status information; determine a compression factor and a redundancy factor based on the transmission status information; perform time domain data compression processing on the audio data according to the compression factor to obtain compressed data; perform channel coding on the compressed data according to the redundancy factor to obtain a data transmission packet; and transmit the data transmission packet.

Therefore, this solution can analyze the transmission status information to determine a current working condition of a channel in real time. When the channel is congested, the channel congestion can be improved by modifying the compression factor, so that the data latency rate and the packet loss rate can be reduced, and the channel stability can be improved. When the channel packet loss rate is high, issues such as packet loss can be improved by modifying the redundancy factor, so that correct and complete data transmission is ensured. In this solution, a channel utilization rate is improved, so that data transmission is faster and more stable. Therefore, the data transmission efficiency is improved.

Figure 2:
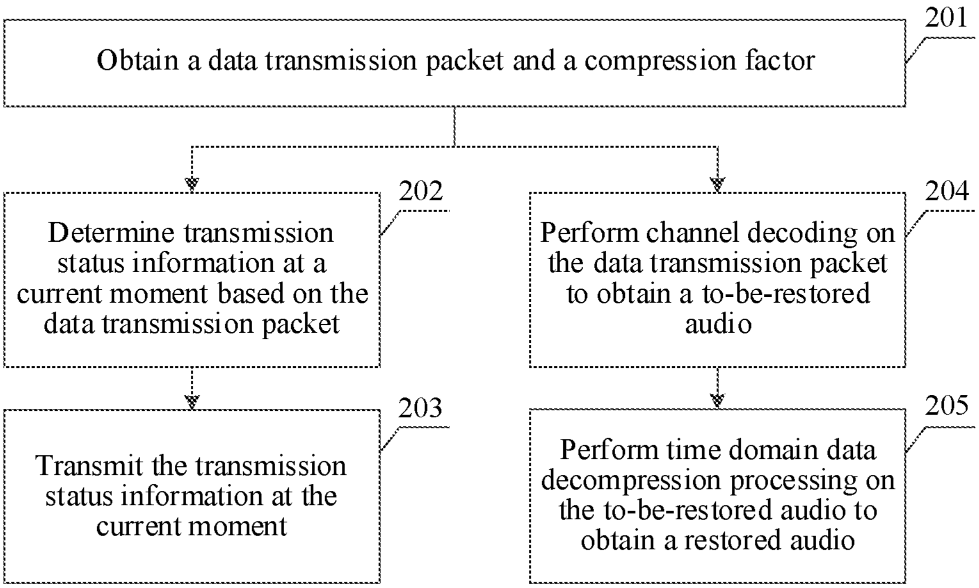
FIG. 2 is a second schematic flowchart of a data transmission method according to an embodiment of the disclosure.

In some embodiments, a data transmission method based on data transmission is provided. As shown in FIG. 2, the description is made by using an example in which the method is applied to a receiving end, and the process of the data transmission method may be as follows:

201: Obtain a data transmission packet and a compression factor.

In this embodiment, the data transmission packet transmitted by a transmitting end can be obtained through a channel.

In some embodiments, the compression factor transmitted by the transmitting end can be obtained while obtaining the data transmission packet transmitted by the transmitting end.

In some embodiments, the data transmission packet may include a compression factor identifier, and the compression factor can be obtained by identifying the compression factor identifier.

For example, in some embodiments, a data transmission packet header is the compression factor identifier, and the compression factor can be obtained by reading the header.

202: Determine transmission status information at a current moment based on the data transmission packet.

In some embodiments, the channel status can be analyzed either at the transmitting end or at the receiving end.

Therefore, in some embodiments, operation 202 may include the following:

- collecting statistics on the received data transmission packet to obtain a receiving quantity;
- calculating a packet loss rate according to the transmission quantity and the receiving quantity; and
- determining the transmission status information at the current moment, the transmission status information including the packet loss rate.

For the receiving quantity, the transmission quantity, the packet loss rate, and the transmission status information, reference may be made to the description in operation 102 and operation 103.

203: Transmit the transmission status information at the current moment.

In this embodiment, the transmission status information at the current moment can be transmitted to a transmitting terminal.

The transmission status information at the current moment can be transmitted to a transmitting terminal by using a plurality of methods. For example, the transmission status information at the current moment is transmitted to the transmitting terminal through a network, a storage medium, or the like.

204: Perform channel decoding on the data transmission packet to obtain target data to be restored (or referred to as to-be-restored data or to-be-restored audio).

The channel decoding corresponds to the channel coding to restore the data coded by channel coding to a state before the channel coding.

In some embodiments, the data transmission packet may include redundant data and transmission data. The transmission data can be coded by the channel coding based on the redundant data, so that the checking, error correction, and supplement of the transmission data are implemented, and the target data is obtained.

Corresponding to the channel coding method, there are a variety of channel decoding methods, for example, a forward error correction (FEC) code, a reed-solomon (RS) code, a convolutional code, a turbo code, or the like.

205: Perform time domain data decompression processing on the target data according to the compression factor to obtain restored data.

The time domain data decompression refers to the data modification, addition, or insertion to electronic data in a time domain to achieve the decompression effect.

The time domain data decompression methods are similar to the time domain data compression methods, for example, an SOLA algorithm, a PSOLA algorithm, a WSOLA algorithm, or the like.

For example, in some embodiments, to resolve the decompressed data discontinuity, the OLA algorithm can be adopted to perform time domain data decompression. The time domain data decompression methods are similar to the time domain data compression methods, and operation 103 may include the following:

- determining a corresponding decompression factor according to the compression factor;
- determining a sampling window according to the decompression factor;
- performing data sampling on the target data based on the sampling window to obtain target sub-data to be restored; and
- synthesizing the target sub-data to obtain the restored data.

The compression factor and the decompression factor correspond to each other. For example, in some embodiments, a compression factor x corresponds to a decompression factor 1/x. For example, in some embodiments, a compression factor x corresponds to a decompression factor 1-x.

Similarly, in some embodiments, to resolve issues such as compressed data discontinuity, poor voice quality, the WSOLA algorithm can be adopted to perform time domain data decompression, and the operation "synthesizing the target sub-data to obtain the restored data" may include the following:

- calculating a waveform cross-correlation coefficient between the target sub-data;
- determining target sub-data with similar waveforms according to the waveform cross-correlation coefficient; and
- performing waveform overlap-add processing on the target sub-data with the similar waveforms to obtain the restored data.

For the waveform cross-correlation coefficient and the waveform overlap-add processing, reference may be made to operation 103.

The data transmission solution provided in the embodiments of the disclosure may be applied to various data transmission scenarios, for example, in an audio transmission scenario, especially VoIP, a voice broadcasting, an audio and video live broadcasting, or the like, which have relatively high requirements for a packet loss rate and a latency rate. According to the embodiments of the disclosure, a working condition of the channel can be transmitted to the transmitting end in real time, so that the transmitting end can monitor the channel and control redundant data transmission and audio compression effect. Therefore, the solution provided in the embodiments of the disclosure can perform data transmission more efficiently while ensuring the audio effect.

It can be seen from the above that, the embodiments of the disclosure can obtain a data transmission packet, the data transmission packet including redundant data and a compression factor; determine transmission status information at a current moment based on the data transmission packet; transmit the transmission status information at the current moment; perform channel decoding on the data transmission packet according to the redundant data to obtain target data; and perform time domain data decompression processing on the target data according to the compression factor to obtain restored data.

Therefore, in this solution, statistics on the transmission status information can be collected and transmitted to the transmitting end to analyze the channel status, modify the compression factor to improve issues such as the channel congestion, and modify the redundancy factor to improve issues such as the packet loss, so that correct and complete data transmission is ensured, a channel utilization rate is improved, and data transmission is faster and more stable. Therefore, this solution can improve the efficiency of the data transmission method.

To resist the packet loss caused by the network instability and reduce the stuttering and incoherent sound problems at the receiving end, a variety of channel coding methods can be adopted to compensate for the packet loss, for example, a forward error correction (FEC) method, a packet loss concealment (PLC) method, an automatic repeat request (ARQ) method, or the like.

The FEC technology compensates for the packet loss by using redundant information generated through redundant coding, whose packet loss resistance capability is proportional to the bandwidth of a using channel thereof. The FEC technology may use redundant information to recover packet loss in a case that the packet loss occurs at the receiving end, and the more the redundant information, the stronger the capability to resist packet loss and the larger the bandwidth occupancy. However, the more bandwidth occupancy may result in poor network quality and more packet loss.

In this embodiment, a data transmission system based on data transmission is provided. The data transmission system may include a transmitting end and a receiving end. The method in this embodiment of the disclosure is described in detail below by using an example in which the FEC technology is used for audio transmission between the transmitting end and the receiving end.

Figure 3:
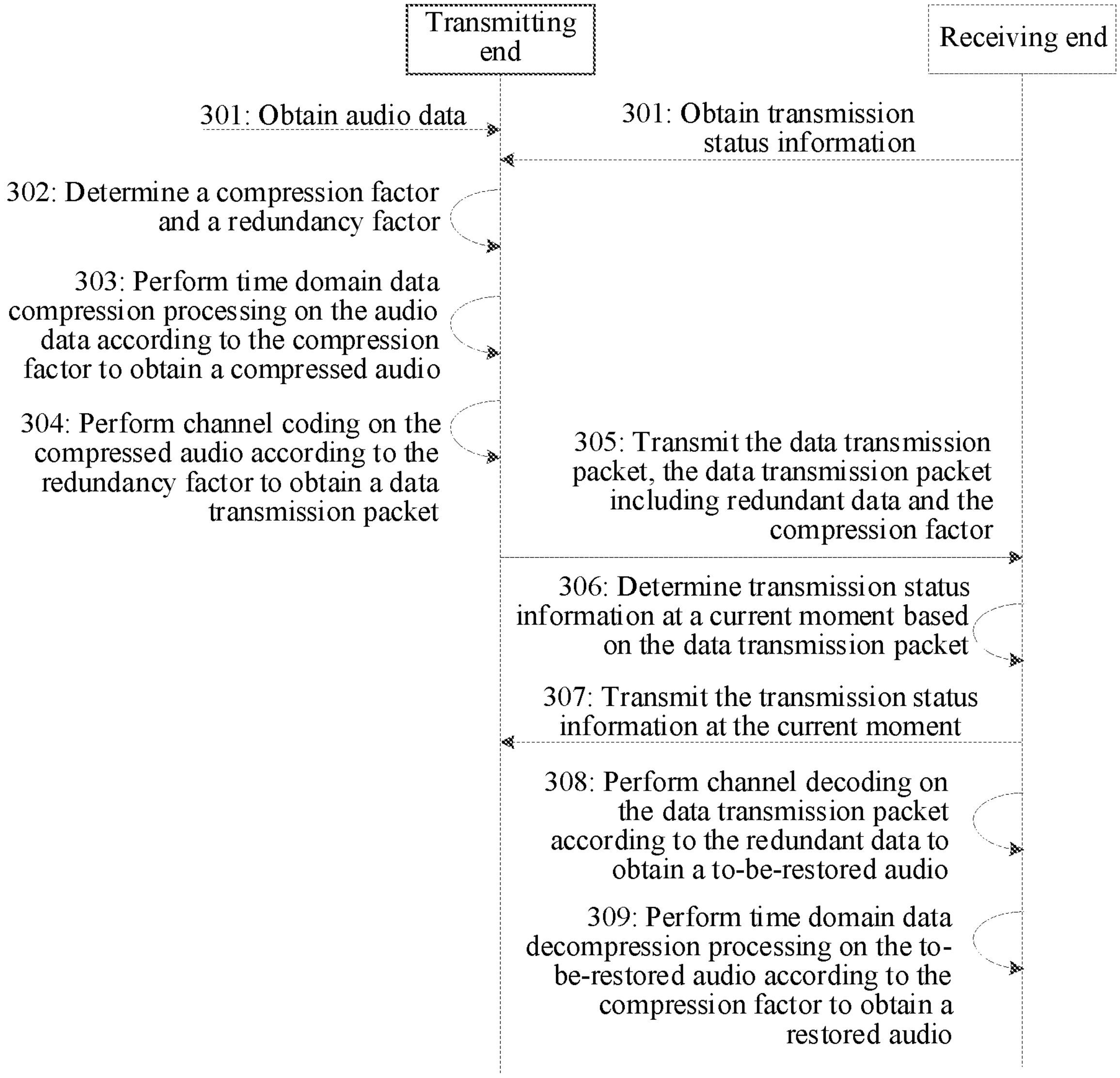
FIG. 3 is a schematic flowchart of a data transmission system according to an embodiment of the disclosure.

As shown in FIG. 3, the process of a data transmission system is as follows:

301: A transmitting end obtains audio data and transmission status information from a receiving end.

302: The transmitting end determines a compression factor and a redundancy factor based on the transmission status information.

In this embodiment, a network packet loss rate after the audio bandwidth occupancy is increased, that is, the network packet loss rate after a redundancy rate is increased, can be analyzed.

Statistics on the packet loss rate and a sender bit rate of the transmitting end can be collected.

The increase in the sender bit rate will not necessarily affect the packet loss rate unless the network bandwidth reaches the upper limit. However, if the network bandwidth reaches the upper limit, the packet loss rate will increase after the sender bit rate is increased. If the phenomenon becomes relatively stable, it can be determined that the network bandwidth has reached the upper limit state, and therefore this solution can be started for data transmission.

303: The transmitting end performs time domain data compression processing on the audio data according to the compression factor to obtain a compressed audio.

In this embodiment, the WSOLA algorithm can be adopted to divide an original speech signal into frames with a length of L, and then the original speech signal is synthesized in units of the frames.

Provided that the compression factor is α, to overcome the noise problem caused by issues such as spectrum breakage, or phase discontinuity in a frame synthesis process, the synthesis process may include performing sampling at a sampling point $\tau(L_k)$ of the original signal.

A calculation method of the sampling point $\tau(L_k)$ is as follows:

$$L_k = kL, \tau(L_k) = \alpha L_k \qquad \text{i.}$$

moving within a neighborhood [−Δmax, Δmax] of the sampling point, where the neighborhood [−max, Δmax] can be set by a technician; and then finding a most relevant waveform to a decomposed k-th frame signal waveform, determining the waveform as a starting position of a synthesized frame, and performing overlap-add processing after windowing through the Hanning window to obtain a new speech signal of time domain data compression or decompression.

Because the time domain data compression of a voice has a more obvious effect on bandwidth saving, the impact of FEC redundancy enhancement on channel bandwidth can be effectively improved.

304: The transmitting end performs channel coding on the compressed audio according to the redundancy factor to obtain a data transmission packet.

305: The transmitting end transmits the data transmission packet to the receiving end and the receiving end obtains the data transmission packet from the transmitting end, the data transmission packet including redundant data and the compression factor.

306: The receiving end determines transmission status information at a current moment based on the data transmission packet.

307: The receiving end transmits the transmission status information at the current moment to the transmitting end.

308: The receiving end performs channel decoding on the data transmission packet according to the redundant data to obtain a target audio to be restored (or referred to as to-be-restored audio).

309: The receiving end performs time domain data decompression processing on the target audio according to the compression factor to obtain a restored audio.

In this embodiment, provided that the compression factor is α, then a decompression factor at this time can be 1/α.

For the process above, reference may be made to operations 101 to 105 and operations 201 to 205.

It can be seen from the above that, in the embodiments of the disclosure, the data transmission system may include a transmitting end and a receiving end. The transmitting end can obtain audio data and transmission status information from the receiving end; determine a compression factor and a redundancy factor based on the transmission status information; perform time domain data compression processing on the audio data according to the compression factor to obtain a compressed audio; perform channel coding on the compressed audio according to the redundancy factor to obtain a data transmission packet; and transmit the data transmission packet to the receiving end. The receiving end can obtain the data transmission packet and the compression factor from the transmitting end, the data transmission packet including redundant data and the compression factor; determine transmission status information at a current moment based on the data transmission packet; transmit the transmission status information at the current moment to the transmitting end; perform channel decoding on the data transmission packet according to the redundant data to obtain a target audio; and perform time domain data decompression processing on the target audio according to the compression factor to obtain a restored audio.

Therefore, this solution can modify a time domain scale of an audio while ensuring that an audio frequency remains unchanged, thereby extending or shortening the audio duration without significantly reducing the audio quality. Because a pitch frequency of a speech can be guaranteed not to be damaged during the modification of the time domain scale, a timbre and tone of a modified speech can be well protected.

In addition, when it is detected that, the higher the redundancy rate, the higher the packet loss rate. In this solution, a voice signal source in a time domain is first compressed to reduce the sender bit rate, then a time domain scale modification ratio the same as the transmitting end is used to perform time domain data decompression after decoding is performed at the receiving end, and the original signal is restored. Therefore, this solution not only ensures the audio quality in the case of channel packet loss, but also reduces the channel working pressure, balances the audio quality and channel stability in real time, makes the channel more stable, further smooths the channel transmission, thereby improving the data transmission efficiency.

The operations of the embodiments of the disclosure are not necessarily performed according to a sequence indicated by operation numbers. Unless otherwise explicitly specified in the disclosure, execution of the operations is not strictly limited, and the operations may be performed in other sequences. Moreover, at least some of the operations in each embodiment may include a plurality of sub-operations or a plurality of stages. The sub-operations or stages are not necessarily performed at the same moment but may be performed at different moments. The sub-operations or stages are not necessarily performed sequentially, but may be performed in turn or alternately with another operation or at least some of sub-operations or stages of the another operation.

To implement the foregoing method better, an embodiment of the disclosure further provides a data transmission apparatus. The data transmission apparatus may be integrated in an electronic device, and the electronic device may be a device such as a terminal, or a server.

For example, in this embodiment, the method in this embodiment of the disclosure is described in detail by using an example in which a data transmission apparatus is integrated in a data transmitting end.

Figure 4:
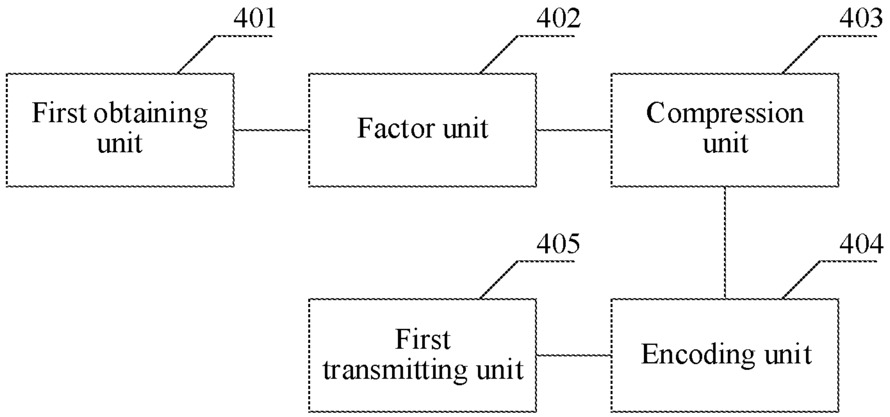
FIG. 4 is a first schematic structural diagram of a data transmission apparatus according to an embodiment of the disclosure.

For example, as shown in FIG. 4, the data transmission apparatus may include a first obtaining unit 401, a factor unit 402, a compression unit 403, an encoding unit 404, and a first transmitting unit 405, which are as follows:

1. First Obtaining Unit 401:
   the first obtaining unit 401 can be configured to obtain audio data and transmission status information.
2. Factor Unit 402:
   the factor unit 402 can be configured to determine a scaling factor and a redundancy factor based on the transmission status information.

In some embodiments, the transmission status information includes a receiving quantity. Therefore, the factor unit 402 may include a statistical subunit, a packet loss rate subunit, a redundancy factor subunit, and a compression factor subunit, which are as follows:

(1) Statistical Subunit:
the statistical subunit can be configured to collect statistics on the transmitted data transmission packet to obtain a sender bit rate and a transmission quantity.

(2) Packet Loss Rate Subunit:
the packet loss rate subunit can be configured to calculate a packet loss rate according to the transmission quantity and the receiving quantity.

(3) Redundancy Factor Subunit:
the redundancy factor subunit can be configured to determine a redundancy factor based on the packet loss rate.

(4) Compression Factor Subunit:
the compression factor subunit can be configured to determine a compression factor based on the packet loss rate and the sender bit rate.

In some embodiments, the compression factor subunit may be configured to:
- collect statistics on the packet loss rate and the sender bit rate respectively to obtain a first change trend corresponding to the packet loss rate and a second change trend corresponding to the sender bit rate, and a correlation between the packet loss rate and the sender bit rate; and
- determine the compression factor according to the packet loss rate and the sender bit rate in a case that the first change trend and the second change trend are both rising trends and the correlation between the packet loss rate and the sender bit rate is positive.

3. Compression Unit 403:
   the compression unit 403 can be configured to perform time domain data compression processing on the audio data according to the scaling factor to obtain compressed data.

In some embodiments, the compression unit 403 may be configured to:
- perform pitch analysis on the audio data to determine a pitch point corresponding to the audio data;
- perform data sampling on the audio data according to the pitch point to obtain a plurality of pieces of sub-audio data;
- select target sub-audio data from the plurality of pieces of sub-audio data according to the compression factor; and
- synthesize the target sub-audio data to obtain the compressed data.

In some embodiments, the compression unit 403 may include a compression window subunit, a compression sampling subunit, and a compression subunit, which are as follows:

(1) Compression Window Subunit:
the compression window subunit can be configured to determine a sampling window according to the compression factor.

(2) Compression Sampling Subunit:
the compression sampling subunit can be configured to perform data sampling on the audio data based on the sampling window to obtain sub-audio data.

(3) Compression Subunit:
the compression subunit can be configured to synthesize the sub-audio data to obtain the compressed data.

In some embodiments, the compression subunit may be configured to:
- calculate a waveform cross-correlation coefficient between the sub-audio data;
- determine sub-audio data with similar waveforms according to the waveform cross-correlation coefficient; and
- perform waveform overlap-add processing on the sub-audio data with the similar waveforms to obtain the compressed data.

4. Encoding Unit 404:
   the encoding unit 404 can be configured to perform channel coding on the compressed data according to the redundancy factor to obtain a data transmission packet.

In some embodiments, the encoding unit 404 may be configured to:

perform channel coding on the redundancy factor to obtain a compression factor identifier; and perform channel coding on the compressed data according to the compression factor identifier to obtain the data transmission packet.

5. First Transmitting Unit 405:

the first transmitting unit 405 can be configured to transmit the data transmission packet.

During implementation, the foregoing units may be implemented as independent entities, or may be combined arbitrarily, or may be implemented as the same entity or several entities. For implementation of the foregoing units, reference may be made to the foregoing method embodiments. Details are not described herein again.

It can be seen from the above that, in the data transmission apparatus of this embodiment, the first obtaining unit obtains audio data and transmission status information; the factor unit determines a scaling factor and a redundancy factor based on the transmission status information; the compression unit performs time domain data compression processing on the audio data according to the scaling factor to obtain compressed data; the encoding unit performs channel coding on the compressed data according to the redundancy factor to obtain a data transmission packet; and the first transmitting unit transmits the data transmission packet.

Therefore, in the embodiments of the disclosure, the data transmission efficiency can be improved.

To implement the foregoing method better, an embodiment of the disclosure further provides a data transmission apparatus. The data transmission apparatus may be integrated in a receiving end.

For example, in this embodiment, the method in this embodiment of the disclosure is described in detail by using an example in which a mobile phone is used as the receiving end.

Figure 5:
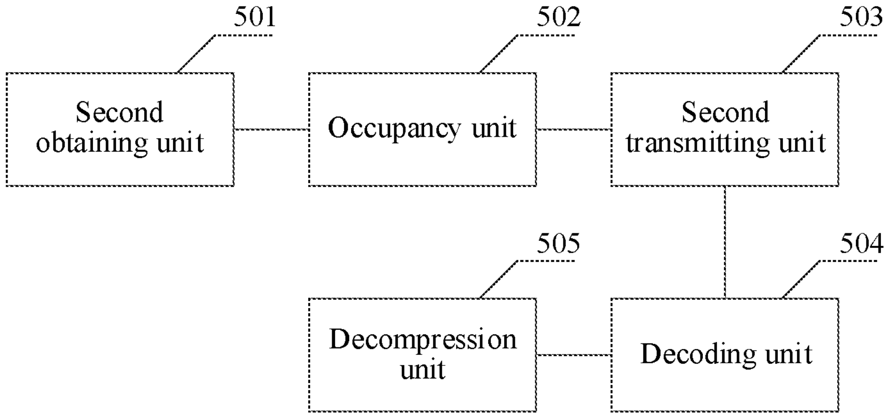
FIG. 5 is a second schematic structural diagram of a data transmission apparatus according to an embodiment of the disclosure.

For example, as shown in FIG. 5, the data transmission apparatus may include a second obtaining unit 501, an occupancy unit 502, a second transmitting unit 503, a decoding unit 504, and a decompression unit 505, which are as follows:

1. Second Obtaining Unit 501:

the second obtaining unit 501 can be configured to obtain a data transmission packet and a scaling factor.

2. Occupancy Unit 502:

the occupancy unit 502 can be configured to determine transmission status information at a current moment based on the data transmission packet.

In some embodiments, the occupancy unit 502 may be configured to:

collect statistics on the received data transmission packet to obtain a receiving quantity;

calculate a packet loss rate according to the transmission quantity and the receiving quantity; and determine transmission status information at a current moment, the transmission status information including the packet loss rate.

3. Second Transmitting Unit 503:

the second transmitting unit 503 can be configured to transmit the transmission status information at the current moment.

4. Decoding Unit 504:

the decoding unit 504 can be configured to perform channel decoding on the data transmission packet to obtain target data to be restored.

5. Decompression Unit 505:

a decompression unit 505 can be configured to perform time domain data decompression processing on the target data according to the scaling factor to obtain restored data.

In some embodiments, the decompression unit 505 may include a decompression factor subunit, a decompression window subunit, a decompression sampling subunit, and a restoration subunit, which are as follows:

(1) Decompression Factor Subunit:

the decompression factor subunit can be configured to determine a corresponding decompression factor according to the compression factor.

(2) Decompression Window Subunit:

the decompression window subunit can be configured to determine a sampling window according to the decompression factor.

(3) Decompression Sampling Subunit:

the decompression sampling subunit can be configured to perform data sampling on the target data based on the sampling window to obtain target sub-data.

(4) Restoration Subunit:

the restoration subunit can be configured to synthesize the target sub-data to obtain the restored data.

In some embodiments, the restoration subunit may be configured to:

calculate a waveform cross-correlation coefficient between the target sub-data;

determine target sub-data with similar waveforms according to the waveform cross-correlation coefficient; and perform waveform overlap-add processing on the target sub-data with the similar waveforms to obtain the restored data.

During implementation, the units, or code, may be implemented as independent entities, or may be combined arbitrarily, or may be implemented as the same entity or several entities. For implementation of the foregoing units, reference may be made to the foregoing method embodiments. Details are not described herein again.

It can be seen from the above that, in the data transmission apparatus of this embodiment, the second obtaining unit obtains a data transmission packet and a scaling factor; the occupancy unit determines transmission status information at a current moment based on the data transmission packet; the second transmitting unit transmits the transmission status information at the current moment; the decoding unit performs channel decoding on the data transmission packet to obtain target data; and the decompression unit performs time domain data decompression processing on the target data according to the scaling factor to obtain restored data.

Therefore, in the embodiments of the disclosure, the data transmission can be improved.

An embodiment of the disclosure further provides an electronic device, and the electronic device may be a device such as a terminal, or a server.

Figure 6:
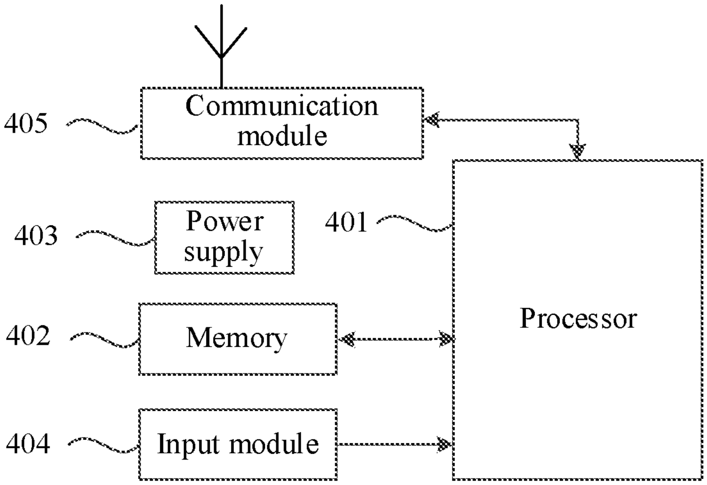
FIG. 6 is a schematic structural diagram of an electronic device according to an embodiment of the disclosure.

In this embodiment, a detailed description is made by using an example in which a terminal is used as the electronic device of this embodiment. For example, FIG. 6 is a schematic structural diagram of a terminal according to an embodiment of the disclosure The terminal may include components such as a processor 601 including one or more processing cores, a memory 602 storing one or more computer-readable storage media, a power supply 603, an input module 604, and a communication module 605. A person skilled in the art may understand that the terminal structure shown in FIG. 4 does not constitute a limitation on the terminal, and may include more or fewer components than those shown in the figure, or combine some components, or have different component arrangements.

The processor 601 is a control center of the terminal, and is connected to various parts of the terminal by using various interfaces and lines. By running or executing the software program and/or module stored in the memory 602, and invoking data stored in the memory 602, the processor performs various functions and data processing of the terminal, thereby performing overall monitoring on the terminal. In some embodiments, the processor 601 may include one or more processing cores. In some embodiments, the processor 601 may integrate an application processor and a modem processor, where the application processor mainly processes an operating system, a user interface, an application program, or the like, and the modem processor mainly processes wireless communications. It may be understood that the foregoing modem processor may alternatively not be integrated into the processor 601.

The memory 602 may be configured to store a software program and a module, and the processor 601 runs the software program and the module stored in the memory 602, to implement various functional applications and data processing. The memory 602 may mainly include a program storage area and a data storage area. The program storage area may store an operating system, an application program required by at least one function (for example, a sound playback function and an image playback function), or the like. The data storage area may store data created according to use of the terminal. In addition, the memory 602 may include a high speed random access memory, and may further include a non-volatile memory, such as at least one magnetic disk storage device, a flash memory, or another volatile solid storage device. Correspondingly, the memory 602 may further include a memory controller, to allow the processor 601 to access the memory 602.

The terminal further includes the power supply 603 for supplying power to the components. In some embodiments, the power supply 603 may be logically connected to the processor 601 by using a power management system, thereby implementing functions such as charging, discharging, and power consumption management by using the power management system. The power supply 603 may further include one or more direct current or alternating current power supplies, a re-charging system, a power failure detection circuit, a power supply converter or inverter, a power supply state indicator, and any other component.

The terminal may further include an input unit 604. The input unit 604 may be configured to receive inputted digit or character information, and generate a keyboard, mouse, joystick, optical or track ball signal input related to the user setting and function control.

The terminal may further include the communication module 605. In some embodiments, the communication module 605 may include a wireless module. The terminal may perform a short distance wireless transmission through the wireless module of the communication module 605, to provide wireless broadband Internet access for the user. For example, the communication module 605 may be configured to help a user receive and send an email, browse a web page, access streaming media, or the like.

Although not shown in the figure, the terminal may further include a display unit.

In some embodiments, the disclosure further provides a terminal, including a memory and a processor, the memory storing computer-readable instructions, the computer-readable instructions, when executed by the processor, causing the processor to perform operations in any one of the data transmission methods according to the embodiments of the disclosure.

In some embodiments, the disclosure further provides one or more non-volatile storage media storing computer-readable instructions, the computer-readable instructions, when executed by one or more processors, causing the one or more processors to perform operations in any one of the data transmission methods according to the embodiments of the disclosure.

A person of ordinary skill in the art may understand that all or some of the procedures of the methods of the foregoing embodiments may be implemented by computer-readable instructions instructing relevant hardware. The computer-readable instructions may be stored in a non-volatile computer-readable storage medium. When the computer-readable instructions are executed, the procedures of the embodiments of the foregoing methods may be included. Any reference to a memory, a storage, a database, or another medium used in the embodiments provided in the disclosure may include at least one of a non-volatile memory and a volatile memory. The non-volatile memory may include a read-only memory (ROM), a magnetic tape, a floppy disk, a flash memory, an optical memory, or the like. The volatile memory may include a random access memory (RAM) or an external cache. For the purpose of description instead of limitation, the RAM is available in a plurality of forms, such as a static RAM (SRAM) or a dynamic RAM (DRAM).

The data transmission method and apparatus, the terminal, and the computer-readable storage medium provided in the embodiments of the disclosure are described above in detail. Although the principles and implementations of the disclosure are described by using specific examples in the specification, the foregoing descriptions of the embodiments are only intended to help understand the method and core idea of the disclosure. In addition, a person skilled in the art can make variations in terms of the specific implementations and application scopes according to the ideas of the disclosure. Therefore, the content of this specification shall not be construed as a limitation to the disclosure.

What is claimed is:

1. A data transmission method, performed by a computer device, the method comprising:

obtaining audio data and transmission status information;

determining a compression factor and a redundancy factor based on the transmission status information;

performing time domain data compression processing on the audio data according to the compression factor to obtain compressed data;

performing channel coding on the compressed data according to the redundancy factor to obtain a data transmission packet; and transmitting the data transmission packet, wherein the performing channel coding comprises:

performing channel coding on the redundancy factor to obtain a compression factor identifier, and performing channel coding on the compressed data according to the compression factor identifier to obtain the data transmission packet.

2. The data transmission method according to claim 1, wherein the transmission status information comprises a receiving quantity; the determining comprises:

collecting statistics on the transmitted data transmission packet to obtain a sender bit rate and a transmission quantity;

calculating a packet loss rate according to the transmission quantity and the receiving quantity;

determining the redundancy factor based on the packet loss rate; and determining the compression factor based on the packet loss rate and the sender bit rate; and the transmitting comprises:

transmitting the data transmission packet and the redundancy factor.

3. The data transmission method according to claim 2, wherein the determining the compression factor based on the packet loss rate and the sender bit rate comprises:

collecting statistics on the packet loss rate and the sender bit rate respectively to obtain a first change trend corresponding to the packet loss rate and a second change trend corresponding to the sender bit rate, and a correlation between the packet loss rate and the sender bit rate; and determining the compression factor according to the packet loss rate and the sender bit rate in a case that the first change trend and the second change trend are both rising trends and the correlation between the packet loss rate and the sender bit rate is positive.

4. The data transmission method according to claim 1, wherein the performing time domain data compression processing comprises:

determining a sampling window according to the compression factor;

performing data sampling on the audio data based on the sampling window to obtain sub-audio data; and synthesizing the sub-audio data to obtain the compressed data.

5. The data transmission method according to claim 4, wherein the synthesizing the sub-audio data to obtain the compressed data comprises:

calculating a waveform cross-correlation coefficient between the sub-audio data;

determining sub-audio data with similar waveforms according to the waveform cross-correlation coefficient; and performing waveform overlap-add processing on the sub-audio data with the similar waveforms to obtain the compressed data.

6. The data transmission method according to claim 1, wherein the performing time domain data compression processing comprises:

performing pitch analysis on the audio data to determine a pitch point corresponding to the audio data;

performing data sampling on the audio data according to the pitch point to obtain a plurality of pieces of sub-audio data;

selecting target sub-audio data from the plurality of pieces of sub-audio data according to the compression factor; and synthesizing the target sub-audio data to obtain the compressed data.

7. A data transmission apparatus, adapted to a transmitting end, comprising:

at least one memory configured to store program code;

at least one processor configured to read the program code and operate as instructed by the program code, the program code comprising:

first obtaining code configured to cause the at least one processor to obtain audio data and transmission status information;

factor code configured to cause the at least one processor to determine a scaling factor and a redundancy factor based on the transmission status information;

compression code configured to cause the at least one processor to perform time domain data compression processing on the audio data according to the scaling factor to obtain compressed data;

encoding code configured to cause the at least one processor to perform channel coding on the compressed data according to the redundancy factor to obtain a data transmission packet; and first transmitting code configured to cause the at least one processor to transmit the data transmission packet, wherein the encoding code is further configured to cause the at least one processor to:

perform channel coding on the redundancy factor to obtain a compression factor identifier, and perform channel coding on the compressed data according to the compression factor identifier to obtain the data transmission packet.

8. The data transmission apparatus according to claim 7, wherein the transmission status information comprises a receiving quantity; the factor code is further configured to cause the at least one processor to:

collect statistics on the transmitted data transmission packet to obtain a sender bit rate and a transmission quantity;

calculate a packet loss rate according to the transmission quantity and the receiving quantity;

determine the redundancy factor based on the packet loss rate; and determine the scaling factor based on the packet loss rate and the sender bit rate; and the first transmitting code is further configured to cause the at least one processor to:

transmit the data transmission packet and the redundancy factor.

9. The data transmission apparatus according to claim 8, wherein the determine the scaling factor based on the packet loss rate and the sender bit rate comprises:

collecting statistics on the packet loss rate and the sender bit rate respectively to obtain a first change trend corresponding to the packet loss rate and a second change trend corresponding to the sender bit rate, and a correlation between the packet loss rate and the sender bit rate; and determining the scaling factor according to the packet loss rate and the sender bit rate in a case that the first change trend and the second change trend are both rising trends and the correlation between the packet loss rate and the sender bit rate is positive.

10. The data transmission apparatus according to claim 7, wherein the compression code is further configured to cause the at least one processor to:

determine a sampling window according to the scaling factor;

perform data sampling on the audio data based on the sampling window to obtain sub-audio data; and synthesize the sub-audio data to obtain the compressed data.

11. The data transmission apparatus according to claim 10, wherein the synthesize the sub-audio data to obtain the compressed data comprises:

calculating a waveform cross-correlation coefficient between the sub-audio data;

determining sub-audio data with similar waveforms according to the waveform cross-correlation coefficient; and performing waveform overlap-add processing on the sub-audio data with the similar waveforms to obtain the compressed data.

12. The data transmission apparatus according to claim 7, wherein the compression code is further configured to cause the at least one processor to:

perform pitch analysis on the audio data to determine a pitch point corresponding to the audio data;

perform data sampling on the audio data according to the pitch point to obtain a plurality of pieces of sub-audio data;

select target sub-audio data from the plurality of pieces of sub-audio data according to the scaling factor; and synthesize the target sub-audio data to obtain the compressed data.

13. A non-volatile computer-readable storage medium, storing computer program code that when executed by at least one processor causes the at least one processor to:

obtain audio data and transmission status information;

determine a compression factor and a redundancy factor based on the transmission status information;

perform time domain data compression processing on the audio data according to the compression factor to obtain compressed data;

perform channel coding on the compressed data according to the redundancy factor to obtain a data transmission packet; and transmit the data transmission packet, wherein the perform channel coding comprises:

performing channel coding on the redundancy factor to obtain a compression factor identifier, and performing channel coding on the compressed data according to the compression factor identifier to obtain the data transmission packet.

14. The non-volatile computer-readable storage medium according to claim 13, wherein the transmission status information comprises a receiving quantity; the determine comprises:

collecting statistics on the transmitted data transmission packet to obtain a sender bit rate and a transmission quantity;

calculating a packet loss rate according to the transmission quantity and the receiving quantity;

determining the redundancy factor based on the packet loss rate; and determining the compression factor based on the packet loss rate and the sender bit rate; and the transmit comprises:

transmitting the data transmission packet and the redundancy factor.

15. The non-volatile computer-readable storage medium according to claim 14, wherein the determining the compression factor based on the packet loss rate and the sender bit rate comprises:

collecting statistics on the packet loss rate and the sender bit rate respectively to obtain a first change trend corresponding to the packet loss rate and a second change trend corresponding to the sender bit rate, and a correlation between the packet loss rate and the sender bit rate; and determining the compression factor according to the packet loss rate and the sender bit rate in a case that the first change trend and the second change trend are both rising trends and the correlation between the packet loss rate and the sender bit rate is positive.

16. The non-volatile computer-readable storage medium according to claim 13, wherein the perform time domain data compression processing comprises:

determining a sampling window according to the compression factor;

performing data sampling on the audio data based on the sampling window to obtain sub-audio data; and synthesizing the sub-audio data to obtain the compressed data.

17. The non-volatile computer-readable storage medium according to claim 16, wherein the synthesizing the sub-audio data to obtain the compressed data comprises:

calculating a waveform cross-correlation coefficient between the sub-audio data;

determining sub-audio data with similar waveforms according to the waveform cross-correlation coefficient; and performing waveform overlap-add processing on the sub-audio data with the similar waveforms to obtain the compressed data.

18. The non-volatile computer-readable storage medium according to claim 13, wherein the perform time domain data compression processing comprises:

performing pitch analysis on the audio data to determine a pitch point corresponding to the audio data;

performing data sampling on the audio data according to the pitch point to obtain a plurality of pieces of sub-audio data;

selecting target sub-audio data from the plurality of pieces of sub-audio data according to the compression factor; and synthesizing the target sub-audio data to obtain the compressed data.

* * * * *